United States Patent [19]

Morin

[11] 4,286,363

[45] Sep. 1, 1981

[54] METHOD OF ASSEMBLY FOR A BALL AND SOCKET JOINT

[75] Inventor: Gérard Morin, Libiaire, France

[73] Assignee: Societe Anonyme D.B.A., Drancy, France

[21] Appl. No.: 109,717

[22] Filed: Jan. 4, 1980

[30] Foreign Application Priority Data

Jan. 17, 1979 [FR] France .................. 79 01060

[51] Int. Cl.³ ............................ B21D 53/10
[52] U.S. Cl. .................. 29/149.5 B; 308/DIG. 11; 308/72; 403/122; 403/124; 403/132; 403/133; 403/137
[58] Field of Search .................. 75/200; 29/149.5 B; 308/DIG. 11, 72; 403/122, 124, 132, 133, 137

[56] References Cited
U.S. PATENT DOCUMENTS 2,823,055  2/1958  Booth ...................... 75/200
3,147,537  9/1964  Fadow .................. 29/149.5 B Primary Examiner—Nicholas P. Godici
Assistant Examiner—V. K. Rising
Attorney, Agent, or Firm—Paul D. Schoenle; Ken C. Decker

[57] ABSTRACT

The invention is a method of assembly for a ball-and-socket joint of the preloaded type with automatic taking up of play, comprising a housing, a pivot, a bearing element disposed between these later and a locking ring. After the disposing in the housing of the various components of the joint, the latter is axially loaded until a predetermined value is obtained for the tilting torque, and once this value is obtained, the ring is crimped in the housing by means of punches acting radially, without alteration of the predetermined value of the tilting torque. Application of the ball-and-socket joint assembly in particular for suspension or steering of an automobile vehicle.

4 Claims, 3 Drawing Figures

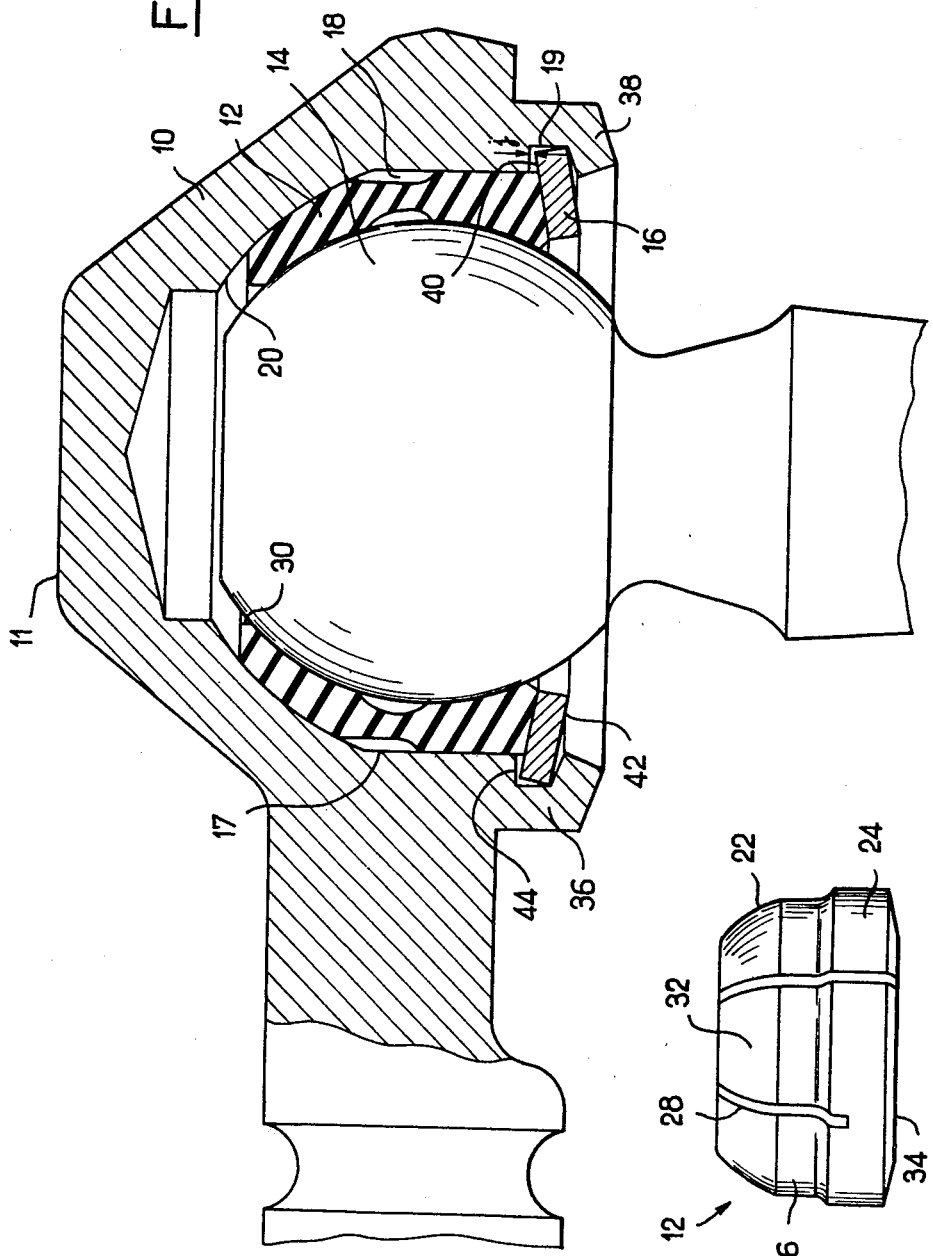
FIG._1
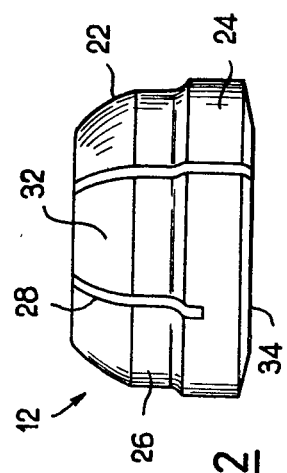
FIG._2

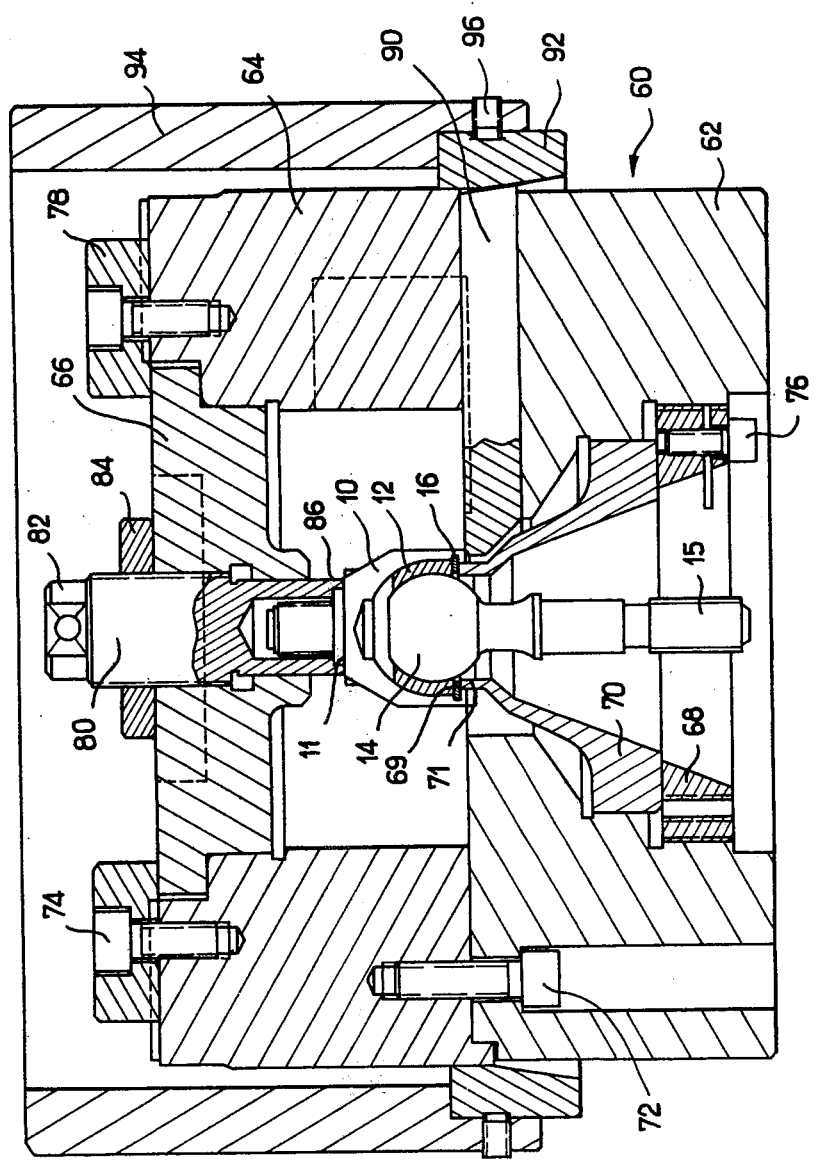
FIG_3

METHOD OF ASSEMBLY FOR A BALL AND SOCKET JOINT

The object of the invention is essentially a method of assembling a ball-and-socket joint in particular for suspension and/or steering of an automobile vehicle; it particularly refers to the assembly of the preloaded type of joint with automatic taking up of play.

Known ball-and-socket joints generally comprise a cup-shaped housing defining a bore in which a bearing element of plastics material having good properties of wear and friction covers the spherical head of a pivot; this element is disposed in the said bore of the housing and a ring applied resiliently against the bearing element and fixed to the housing by crimping to ensure closure of the latter. To obtain conditions of resilience favouring taking up of play due to wear, provision is made for the making of slots in the bearing element.

In ball-and-socket joints of this type, additional means, such as springs or resilient rings are used to obtain a predetermined value for the tilting torque of the ball-and-socket joint; in the absence of such additional means, the usual methods of assembly by crimping of the ring in the housing do not allow the said predetermined value to be obtained with precision.

The present invention proposes a method of assembling a ball-and-socket joint of the above-mentioned type, which is simple and cheap and which gives it characteristics of automatic taking up of play and predetermined calibration of the tilting torque without the need for using the said additional means.

The method of assembly according to the invention concerns a ball-and-socket joint, in particular for suspension or steering of an automobile vehicle, comprising a housing in the general shape of a cup in which a blind bore receives components consisting of a bearing element of plastics material disposed in the said bore and bearing against the bottom of the latter, a pivot presenting a pin and a spherical head resiliently covered by the said bearing element, and a locking ring mounted in the said bore and applied at its internal face against the bearing element, characterised in that, after the various components of the joint have been disposed in the housing, the assembly thus constituted is placed on a tool comprising stressing means acting on the external face of the ring to compress the bearing element and progressively load the joint until a predetermined value of the tilting torque of the pivot is obtained in relation to the housing, and once the said predetermined value has been obtained, the axial load exercised by the said stressing means is maintained and one then folds back towards the axis of the housing all or part of the extreme edge of the latter with the aid of means acting radially on the said edge so as to trap the ring in the bore without altering the predetermined value of the tilting torque.

A preferred embodiment of the invention will now be described with reference to the accompanying drawings in which:

FIG. 1 is a view in axial section of a ball-and-socket joint assembled according to the invention.

FIG. 2 is a side view of the bearing element represented in FIG. 1, before assembly, and FIG. 3 is a view in section of a tool used for assembling a ball-and-socket joint, according to the invention.

The ball-and-socket joint represented in FIG. 1 comprises a housing 10, a bearing element 12, a pivot 14 with spherical head and a ring 16.

The housing 10 appears in the general shape of a cup including a stepped blind bore 18. The blind end of the bore forms a concave spherical supporting surface 20. The bearing element 12 (represented separately in FIG. 2) is realised in a plastics material having good characteristics of wear and friction. It comprises two parts 22 and 24 (connected together by a coupling part 26 of smaller thickness) situated either side of an equatorial plane perpendicular to the axis of the bore 18. The part 22 is supported at its external profile on the surface 20. The part 24 is engaged in the portion of smallest diameter 17 of the stepped bore 18. The bearing element 12 is provided with slots 28 which divide it, from a central orifice 30, into strip-shaped segments 32. One of the slots 28 extends to a support base 34. The bearing element 12 resiliently covers the spherical head of the pivot 14, the two parts 22 and 24 coming into contact with the head via their spherical internal profiles.

The ring 16 is mounted with radial play in the portion of greatest diameter 19 of the stepped bore 18. Bearing on the base 34 of the bearing element 12, it compresses the latter and is kept in its place by a folded back part 38 of the skirt 36 defining the portion 19 of the bore 18.

The tool represented in FIG. 3 allows the realisation of the ball-and-socket joint described above and comprises a bed, axial stressing means and punches.

The bed indicated by the general reference 60 is formed of solids of revolution 62, 64, 66, 68 and 70 connected together by means of fixing screws 72, 74, 76 and via an annular abutment element 78.

The axial stressing means consist of a mechanical screw jack 80, whose head 82 is driven round by a removable lever. Locking means 84 are provided to co-operate with the screw 80.

Punches 90 are radially operated via a frusto-conical ring 92 controlled by a barrel 94 to which it is rigidly locked via a screw 96.

To realise assembly of the joint, one proceeds as follows:

In a first stage, there is introduced onto the pin of the pivot 14 the bearing element 12 which is drawn on by means of its orifice and resiliently engages the spherical head. After the assembly composed of the pivot 14 and its bearing element 12 has been introduced into the bore 18 defined in the housing 10, and after the ring 16 has been drawn onto the shank of the pivot 14 so as to bring the internal face 40 of the ring into contact with the supporting base 34 of the bearing element 12, the assembly thus constituted is placed on the tool described above.

The assembly thus constituted is placed bearing on the face 69 of the tubular end 71 of the element 70 which is in contact with the external face 42 of the ring 16. The assembly is held in place by the stressing element 80 whose end 86 is in contact with the external upper face 11 of the housing 10. By screwing the element 80, the ball-and-socket joint is stressed axially bearing against the element 70 until a load is obtained from which results a predetermined value for the tilting torque of the pivot. This value is tested by means of measuring elements (not represented) connected to the threaded end 15 of the pin of the pivot. The load exercised by the element 80 being maintained, by the locking element 84, the end part 38 of the skirt 36, situated behind the plane defined by the external face 42 of the ring 16, is folded back by means of the radial punches 90 operated by the ring 92. The pivot 14 and the bearing element 12 are thus connected together by the ring without alteration of the axial load exercised on the ball-and-socket joint by the element 80. It should be noted that, at the end of this last operation, the ring 16 is not axially clamped in the bore 19 and that a play "j" remains between the extreme edge of the internal face 40 of the ring, on one hand, and the bottom 44 of the bore of large diameter 19, on the other hand.

Advantageously, the face 69 of the tubular-shaped end part 71 of the element 70 is applied to the ring 18 on a circumference whose diameter will be the largest possible, so as to give the ring 18 a deflection allowing the taking up of the play liable to appear with wear.

The tool represented in FIG. 3 and described above has been used to perfect the method of assembly in a testing plant and so is capable of being improved. Hence, the mechanical jack 80 can be replaced by a hydraulic jack allowing the joint to be progressively loaded by increase of the control pressure until the required value of the tilting torque is obtained.

The maintaining of the said load applied by the hydraulic jack during the final operation of closing the housing is then ensured by stabilizing the pressure in the hydraulic circuit. Furthermore, the use of such hydraulic means allows automation of the method described above applied to the making of ball-and-socket joints in runs.

I claim:

1. Method of assembly for a ball-and-socket joint, in particular for suspension or steering of an automobile vehicle comprising a housing in the general shape of a basin in which a blind bore receives components consisting of a bearing element of plastics material disposed in the said bore and bearing against the bottom of the latter, a pivot presenting a shank and a spherical head resiliently covered by the said bearing element, and a locking ring mounted in the said bore and applied at its internal face against the bearing element, characterised in that, the various components of the joint having been disposed in the housing, the assembly thus constituted is placed on a tool comprising stressing means acting on the external face of the ring to compress the bearing element and progressively load the joint until a predetermined value of the tilting torque of the pivot is obtained in relation to the housing, and once the said predetermined value has been obtained, the axial load exercised by the said stressing means is maintained and one then folds back towards the axis of the housing all or part of the extreme edge of the latter with the aid of means acting radially on the said edge so as to trap the ring in the bore without altering the predetermined value of the tilting torque.

2. Method of assembling a ball-and-socket joint according to claim 1, characterised in that the aforesaid means acting radially consist of punches disposed radially in relation to the axis of the ball-end-socket joint.

3. Method of assembling a ball-and-socket joint according to one of claims 1 and 2, characterised in that the said stressing means comprise a tubular-shaped element bearing on the external face of the ring along a circumference of the largest possible diameter to confer on the said ring a certain deflection on axial stressing of the joint.

4. Method of assembling a ball-and-socket joint according to one of the claims 1 and 2, characterised in that the said stressing means comprise a hydraulic jack allowing a progressive loading of the joint and a maintaining of the said axial load exercised by stabilisation of the pressure during the crimping operation.

* * * * *